(12) United States Patent
Fang

(10) Patent No.: US 9,337,892 B2
(45) Date of Patent: May 10, 2016

(54) METHOD AND SYSTEM FOR SWITCHING MAIN BOARD AND STANDBY BOARD

(75) Inventor: Yu Fang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1174 days.

(21) Appl. No.: 13/257,935

(22) PCT Filed: Apr. 23, 2010

(86) PCT No.: PCT/CN2010/072139
§ 371 (c)(1),
(2), (4) Date: Dec. 22, 2011

(87) PCT Pub. No.: WO2010/148758
PCT Pub. Date: Dec. 29, 2010

(65) Prior Publication Data
US 2012/0112561 A1    May 10, 2012

(30) Foreign Application Priority Data

Jun. 24, 2009   (CN) .......................... 2009 1 0150269

(51) Int. Cl.
*H01H 47/00* (2006.01)
*H01H 83/00* (2006.01)
(Continued)

(52) U.S. Cl.
CPC .............. *H04B 1/74* (2013.01); *G06F 11/2028* (2013.01); *G06F 11/2038* (2013.01); *H04L 1/22* (2013.01); *Y10T 307/826* (2015.04)

(58) Field of Classification Search
CPC ............ G06F 11/2028; G06F 11/2038; Y10T 307/826; H04B 1/74
USPC ......................................... 307/112, 116, 125
See application file for complete search history.

(56) References Cited

U.S. PATENT DOCUMENTS 7,120,118 B2   10/2006   Rajagopal

2003/0119475 A1*   6/2003   Choi .......................... H04L 1/22
                                                                                    455/403
(Continued)

FOREIGN PATENT DOCUMENTS

CN   1710868 A      12/2005
CN   101145895 A  *  3/2008
(Continued)

OTHER PUBLICATIONS

An Evaluation for HLR Duplex System based on a Prototype System, Sep. 28, 1999.
(Continued)

*Primary Examiner* — Rexford Barnie
*Assistant Examiner* — Rasem Mourad
(74) *Attorney, Agent, or Firm* — Oppedahl Patent Law Firm LLC

(57) ABSTRACT

A method and system for switching a main board and a standby board are disclosed. The method comprises: determining one MCU of the plurality of MCUs in the main board as a first main MCU and remaining MCUs as auxiliary MCUs, and determining one MCU of the plurality of MCUs in the standby board as a second main MCU and remaining MCUs as auxiliary MCUs; determining, by the first main MCU, a fault grade of the main board according to faults in the auxiliary MCUs of the main board and faults in the first main MCU; determining, by the first main MCU, a fault grade of the standby board according to faults in the auxiliary MCUs of the standby board and faults in the second main MCU reported by the second main MCU; switching the main board and the standby board according to the fault grade of the standby board and the fault grade of the main board. The switching of the main board and the standby board that comprise respectively a plurality of MCUs is simplified according to the invention.

12 Claims, 4 Drawing Sheets

(51) Int. Cl.
    *H02J 7/00*     (2006.01)
    *H04B 1/74*     (2006.01)
    *G06F 11/20*    (2006.01)
    *H04L 1/22*     (2006.01)

(56) References Cited

U.S. PATENT DOCUMENTS

2006/0272830 A1*  12/2006  Fima .................. E03B 1/00
                                                              169/16
2008/0126864 A1*  5/2008   Abdul ............... G06F 11/2242
                                                              714/31

FOREIGN PATENT DOCUMENTS

| CN | 101334744 A | 12/2008 |
| CN | 101635646 A | 1/2010 |
| EP | 1675272 A1 | 6/2006 |
| GB | 2421661 A | 6/2006 |
| JP | 8161279 A | 6/1996 |
| KR | 19930010291 B1 | 10/1993 |

OTHER PUBLICATIONS

International Search Report in international application No. PCT/CN2010/072139, mailed on Aug. 5, 2010.

English Translation of the Written Opinion of the International Search Authority in international application No. PCT/CN2010/072139, mailed on Aug. 5, 2010.

Supplementary European Search Report in European application No. 10791264.4, mailed on Oct. 8, 2012.

* cited by examiner

METHOD AND SYSTEM FOR SWITCHING MAIN BOARD AND STANDBY BOARD

TECHNICAL FIELD

The invention relates to the field of communications, in particular to a method and system for switching a main board and a standby board.

BACKGROUND

At present, the main/standby backup of single boards is basically adopted in communication equipments having high requirements on reliability, in order to ensure that, in case a fault occurs in the current main single board, another standby single board is able to timely replace the main single board in fault to keep the normal running of the whole system.

The main/standby switching of the single boards is performed generally due to the following three reasons:
1. a switch instructed by operator (a switching by background human-computer commands);
2. fatal faults in a main single board (such as, removal, power failure, heartbeat signal loss and reset of the main single board, etc); and
3. nonfatal faults in a main single board.

The principle for switching the main single board with the nonfatal fault is that: the fault states of the main and standby single boards are graded at first; and the current fault levels of the single boards are given by the self-diagnosis function of the single board software and notified to the opposite board in real time. A system compares the fault levels of the two single boards, and allows a switch between the main single board and the standby single board when the fault level of the main single board is higher than that of the standby single board; otherwise, the current main/standby state remains unchanged. However, along with diverse communication system services and detailed system functional levels, many boards with a plurality of Micro Controller Units (MCUs) has appeared inevitably, particularly network element control single boards in which main/standby backup is generally indispensable. In the related technologies, the application of the single board with a plurality of MCUs has a higher requirement on the main/standby switching mechanism for the conventional single board with a single MCU, specifically as follows:
firstly, each MCU in the single board with a plurality of MCUs is generally able to work separately, that is to say, it can still work normally without other MCUs, which will bring trouble to the deployment of a main/standby switching control software module, i.e., whether the running program of each MCU should comprise the main/standby switching control software module;
secondly, the running program on each MCU has its own fault monitoring mechanism; and the determination of the final fault grade for switching will be very complex when the programs on a plurality of MCUs detect faults at the same time.

It can be seen from the two above-mentioned standpoints that, the main/standby switching of the single board with a plurality of MCUs will become complex if the main/standby switching mechanism for the single board with one MCU is adopted.

SUMMARY

The invention is to solve the problem that the main/standby switching of the single board with a plurality of MCUs becomes complex by following the main/standby switching mechanism for the single board with one MCU in related technologies. The invention provides an improved solution for performing a switch between a main board and a standby board to solve at least one of the problems. In order to achieve the target, according to one aspect of the invention, a method for switching a main board and a standby board is provided.

The method for switching the main board and the standby board, which respectively include a plurality of MCUs, includes the following steps: one MCU of the plurality of MCUs in the main board is determined as a first main MCU and remaining MCUs are determined as auxiliary MCUs; one MCU of the plurality of MCUs in the standby board is determined as a second main MCU and remaining MCUs are determined as auxiliary MCUs; the first main MCU determines the fault grade of the main board according to the faults in the auxiliary MCUs of the main board and the fault in the first main MCU; the first main MCU determines the fault grade of the standby board according to the faults in the auxiliary MCUs of the standby board and the fault in the second main MCU reported by the second main MCU; and the main board and the standby board are switched according to the fault grade of the standby board and the fault grade of the main board.

Preferably, the step that the main board and the standby board are switched according to the fault grade of the standby board and the fault grade of the main board includes: the first main MCU comparing the fault grade of the main board with that of the standby board; and switching the main board and the standby board if the fault grade of the standby board is higher than that of the main board.

Preferably, the step that the main board and the standby board are switched according to the fault grade of the standby board and the fault grade of the main board includes: the first main MCU switch the main board and standby board when a fatal fault occurs in the first main MCU.

Preferably, the step that the first main MCU determines the fault grades of the main board and the standby board according to the fault includes: a priority is set for each fault, wherein the fault priority of the main MCU is higher than that of the auxiliary MCUs; and the first main MCU determines the fault grades of the main board and the standby board according to the fault priorities of the main board and the standby board.

Preferably, the MCUs belonging to one board are all in main states or all in standby states.

In order to achieve the target, according to another aspect of the invention, it provides a system for switching a main board and a standby board.

The system for switching the main board and the standby board includes a main board and a standby board that respectively includes a plurality of MCUs. The standby board includes a second main MCU configured to detect and report the faults in the auxiliary MCUs of the standby board and the faults in the second main MCU, all MCUs except for the second main MCU in the standby board are auxiliary MCUs in the standby board; and the main board includes a first main MCU configured to: determine the fault grade of the main board according to the faults in the auxiliary MCUs of the main board and the faults in the first main MCU, all MCUs except for the first main MCU in the main board are the auxiliary MCUS in the main board; determine the fault grade of the standby board according to the faults in the auxiliary MCUs of the standby board and the faults in the second main MCU reported by the second main MCU; and switch the main board and the standby board according to the fault grade of the main board and the fault grade of the standby board.

Preferably, the first main MCU is further configured to compare the fault grade of the main board with that of the standby board, and switch the main board and the standby board if the fault grade of the standby board is higher than that of the main board.

Preferably, the first main MCU is further configured to switch the main board and standby board when a fatal fault occurs in the first main MCU.

Preferably, the system further includes a first setting module configured to set a priority for each fault, wherein the fault priority of the main MCU is higher than that of the auxiliary MCUs; and the first main MCU is further configured to determine the fault grades of the main board and the standby board according to the fault priorities of the main board and the standby board.

Preferably, the system further includes a second setting module configured to set the MCUs belonging to one board to be all in main states or all in standby states.

According to the invention, a main MCU is determined from a plurality of MCUs to determine whether to perform a switch according to the fault grades determined by the faults monitored by all MCUs, so that the problem that the main/standby switching of a single board with a plurality of MCUs becomes complex by following the main/standby switching mechanism for a single board with an MCU is solved and therefore the switch between the main board and the standby board that include a plurality of MCUs is simplified.

BRIEF DESCRIPTION OF THE DRAWINGS

The drawings herein are used for the further understanding of the present invention and are a part of the subject application, and the schematic embodiments of the present invention and explanation thereof are used for the explanation of the present invention and not limiting the present invention. In the drawings.

DETAILED DESCRIPTION

The embodiment of the invention provides a solution for switching a main board and a standby board, which not only simplifies a switching mechanism but also meets the requirements of a plurality of MCUs. The processing principle of the solution is as follows: a main MCU is determined and only the main MCU is able to operate a main/standby switching control software module; and each MCU program is in charge of monitoring the respective fault, but all faults in all MCU programs in each single board are graded in a unified way, and the main/standby switching control software module determines whether to perform the switch according to a final synthesized fault grade.

It should be noted that, if no conflicts, the embodiments and features thereof in the subject application can be combined with one another. The present invention is detailed below in conjunction with the accompanying drawings and the embodiments.

Figure 1:
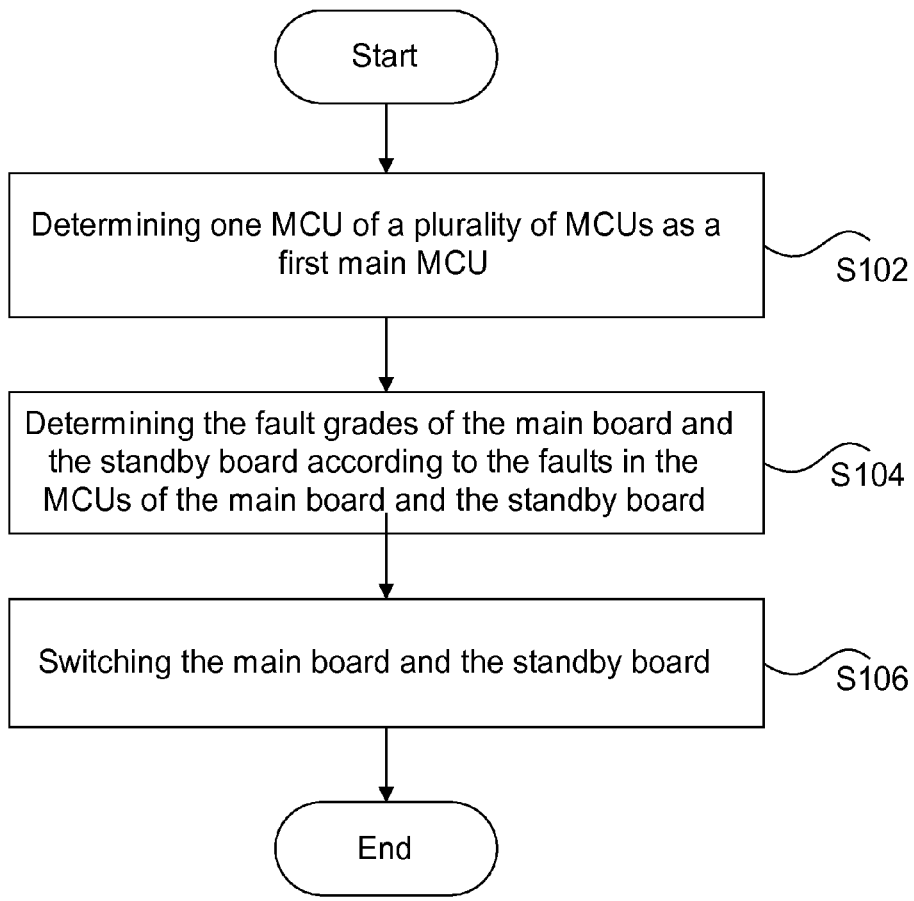
FIG. 1 shows a flowchart of a method for switching a main board and a standby board according to one embodiment of the invention.

In the following embodiments, the steps shown in the flowcharts of the drawings can be executed in, for example, a computer system with a set of computer-executable instructions, and can be also executed in an order different from the logic orders shown in the flowcharts under some circumstances. According to one embodiment of the invention, a method for switching a main board and a standby board is provided and available when both the main board and the standby board include a plurality of MCUs. FIG. 1 shows a flowchart of the method for switching the main board and the standby board according to the embodiment of the invention. As shown in FIG. 1, the method comprises the following steps S102 to S106.

Step S102: one MCU of the plurality of MCUs in the main board is determined as a first main MCU and remaining MCUs are determined as auxiliary MCUs; and one MCU of the plurality of MCUs in the standby board is determined as a second main MCU and remaining MCUs are determined as auxiliary MCUs;

Step S104: the first main MCU determines the fault grade of the main board according to the faults reported by the auxiliary MCUs of the main board and the faults in the first main MCU; and the first main MCU determines the fault grade of the standby board according to the faults reported by the auxiliary MCUs of the standby board and the faults in the second main MCU. It should be understood that the fault grade of the standby board can also be determined by the second main MCU according to the faults reported by the auxiliary MCUs of the standby board and the faults in the second main MCU; and Step S106: the main board and the standby board are switched according to the fault grade of the standby board and the fault grade of the main board. It should be understood that, here, the fault of the first grade is the most serious, the fault of the second grade comes second, and so forth.

In the step S106, the first main MCU compares the fault grade of the main board with that of the standby board, and the main board and the standby board are switched if the fault grade of the standby board is higher than that of the main board. A priority may be set for each fault, the fault priority of the main MCU is higher than that of the auxiliary MCUs. The main MCU determines the fault grade of the main board and the standby board according to the fault priorities.

Preferably, in the step S106, the main board and the standby board are switched when a fatal fault occurs in the first main MCU.

The main/standby switching granularity for the single board is determined that it is necessary to switch the whole single board and the switch of separate MCU is unallowable, i.e., the MCUs in each single board are all in a main state or all in a standby state.

The above-mentioned steps are detailed below in conjunction with the accompanying drawings.

Figure 2:
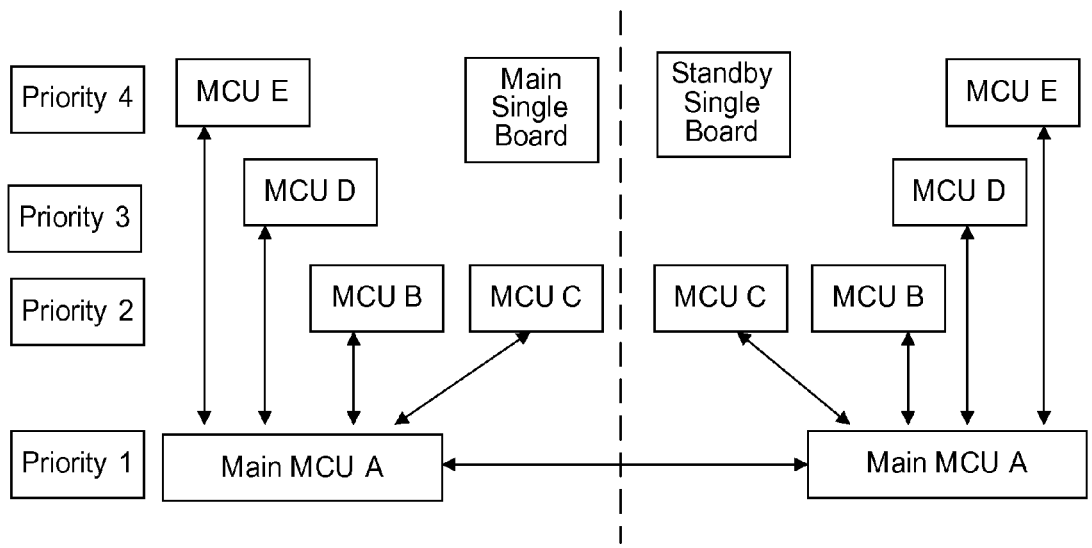
FIG. 2 shows a schematic diagram of the relation among the MCUs of a single board with a plurality of MCUs according to one embodiment of the invention.

FIG. 2 shows a schematic diagram of the relation among the MCUs in a single board with a plurality of MCUs according to one embodiment of the present invention. As shown in FIG. 2, a main MCU of the single board is determined according to the functional localization of a plurality of MCU programs in the system; and only the main MCU program operates the main/standby switching control module and perform the logic judgement on the main/standby switching, while other MCU programs do not operate the main/standby control module. In addition, as shown in FIG. 2, the faults in the plurality of MCUs are prioritized in a unified way, wherein the main MCU has the highest fault priority, each of other MCUs has to have a fault priority which is a reduced one though.

Figure 3:
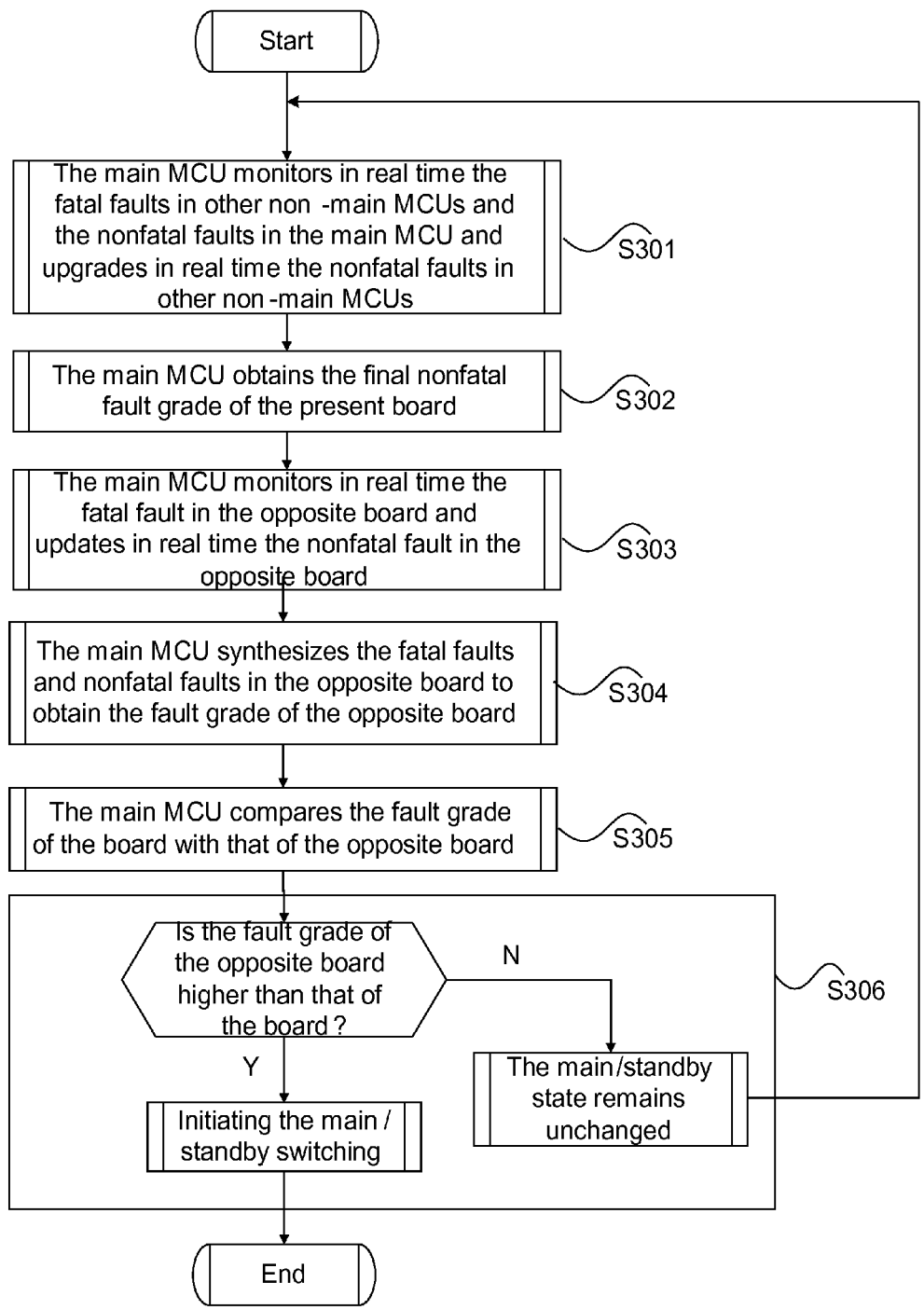
FIG. 3 shows a flowchart of the main/standby switching of a standby single board with a plurality of MCUs according to one preferred embodiment of the invention.

FIG. 3 shows a flowchart of the main/standby switching of a standby single board with a plurality of MCUs according to one preferred embodiment of the invention. As shown in FIG. 3, the flow comprises the following steps S301 to S306:

Step S301: the main MCU monitors in real time the fatal faults in other non-main MCUs and the nonfatal faults in the main MCU, and updates in real time the nonfatal faults in other non-main MCUs which are monitored and notified to the main MCU by the non-main MCUs;

Step S302: the main MCU synthesizes the fatal faults and nonfatal faults in other non-main MCUs of the present board (i.e., the main board) and the fault in the main MCU to obtain the final nonfatal fault grade of the present board, and notifies the opposite board (i.e., the standby board) of the fault grade;

Step S303: the main MCU monitors in real time the fatal faults in the main MCU of the opposite board (i.e., the fatal fault in the opposite board) and updates in real time the nonfatal faults in the opposite board which is notified by the opposite board in real time;

Step S304: the main MCU synthesizes the fatal faults and nonfatal faults in the opposite board to obtain the fault grade of the opposite board;

Step S305: the main MCU compares the fault grade of the present board with that of the opposite board; and Step S306: if the fault grade of the opposite board is higher than that of the present board, the main/standby switching is initiated; otherwise, the current main/standby state remains unchanged and the main MCU continues the monitoring.

It should be understood that, here, the fault of the first grade is the most serious; the fault of the second grade comes second, and so forth.

Figure 4:
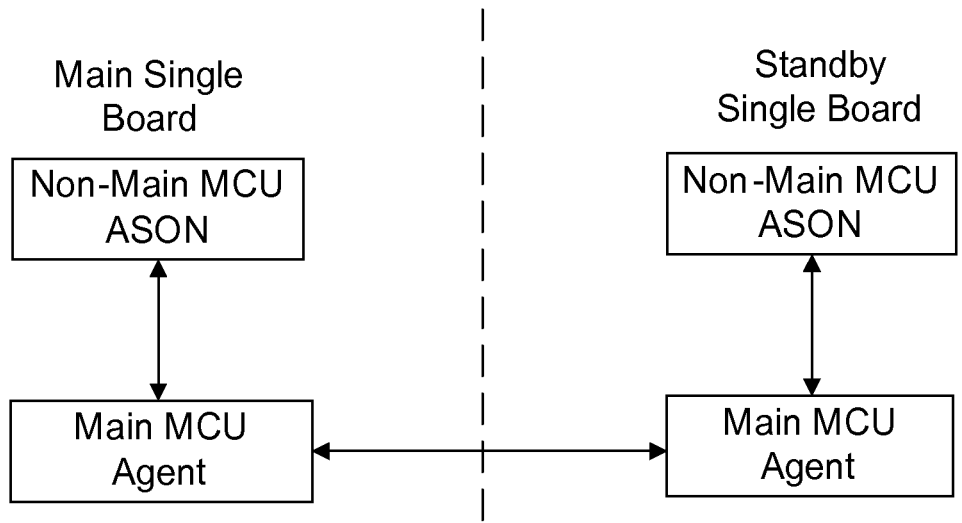
FIG. 4 shows a schematic diagram of the relation between an MCU executing an Agent function and an MCU executing an Automatically Switched Optical Network (ASON) function on a master control board in a transmission network according to one preferred embodiment of the invention.

With a master control board in a transmission network as an example, the implementing processes of the embodiments of the invention are detailed below in conjunction with the accompanying drawings. FIG. 4 shows a schematic diagram of the relation between an MCU executing an Agent function and an MCU executing an ASON function in a master control board in a transmission network according to one preferred embodiment of the invention. As shown in FIG. 4, the master control board for equipment in the transmission network generally operates an Agent program; however, along with the growing requirements of network intelligent management, the ASON function becomes indispensable. With comprehensive consideration of the separation of a control plane and a management plane and not reducing the integration level of the system, both the Agent and ASON are applied to the master control board by many producers and operated by different MCUs.

It is necessary to switch the whole single board of the master control board and the separate switch of the Agent and ASON is unallowable, i.e., both the Agent and ASON on each master control board are in a main state or in a standby state.

At first, the Agent is determined as the main MCU program of the master control board, i.e., only the Agent is able to operate the main/standby switching control module and perform the logic judgement on the main/standby switching, and the ASON does not operate the main/standby switching control module. Since there are only two MCUs and the Agent is determined as the main MCU, the Agent has a higher priority than that of the ASON.

The Agent and ASON respectively monitor their own nonfatal faults that includes fault of memory card, abnormality of database, abnormal communication between the main module and the standby module, etc. The Agent of the main MCU program is in charge of monitoring the fatal faults in the ASON of the present board, which includes absence of ASON MCU, ASON program heartbeat signal loss, etc. The heartbeat signal is used for judging whether the software runs normally and is generated by the software. The heartbeat signal loss fault will occur in the cases of the removal of the single board (and the absence of the single board at the same time), the power failure of the MCU, no software program in the MCUs, no response of software programs, and the reset of the single board. The Agent of the main MCU program synthesizes the fatal faults and nonfatal faults in the ASON and the nonfatal faults in the Agent to obtain the final nonfatal fault grade of the present board. The fatal fault in the main MCU program Agent is monitored by the Agent on the opposite board, including the absence of the Agent MCU, the heartbeat signal loss of the Agent program, etc. The fatal fault in the present board is the fatal fault in the Agent of the main MCU program. The fault grades of the master control board can be obtained according to the regulations above, as shown in Table 1.

TABLE 1

Fault grades of master control board

| Fault grades (BIN) | | Fault Description |
|---|---|---|
| High 4 bits | Low 4 bits | |
| 1111 | 1111 | absence/heartbeat signal loss of the single board (Agent) |
| 0111 | xxxx | absence/heartbeat signal loss of ASON |
| 0011 | xxxx | ASON fault 1 |
| 0010 | xxxx | ASON fault 2 |
| 0001 | xxxx | ASON fault 3 |
| xxxx | 0111 | Agent fault 1 |
| xxxx | 0011 | Agent fault 2 |

The fault grade 0xFF in the first row is the highest one and is the fatal fault in the single board; and other fault grades are the nonfatal faults in the single board.

The fault grades are divided into two parts in order to specifically characterize the fault details of the Agent and the ASON and favour for the comparison of the specific fault grades of the main and standby boards when nonfatal faults in the Agent and the ASON occur at the same time.

The main/standby switching logic is that: when the fault level of the main single board is higher than that of the standby single board, it is necessary to perform the main/standby switching; otherwise, the current main/standby state remains unchanged.

According to the principle above, several specific conditions are analyzed below:

The absence of the Agent (i.e., the absence of the single board of the master control board) and the heartbeat signal loss of the Agent are main/standby switching conditions with the highest priority, that is to say, if the above two events happen in the master control board in main state, the master control board in standby state will be switched to be in main state automatically regardless of the fault state of the ASON at this time, as shown in the following Tables 2 and 3.

TABLE 2

Fault state A of master control board

|  | Main | Standby |
|---|---|---|
| ASON | OK | NG |
| Agent | NG | OK |

TABLE 3

Fault state B of master control board

|  | Main | Standby |
|---|---|---|
| ASON | NG | OK |
| Agent | OK | NG |

In the fault state A of the master control board in Table 2, the current master control board in standby state is certain to initiate the main/standby switching. After being switched, the ASON can make a decision of non-reconfiguration by judging its own state so as to avoid the service interruption.

In the fault state B of the master control board in Table 3, the current master control board in standby state certainly fails to initiate the main/standby switching.

The starting point of the principle above is that: if all different ASON and Agent on two master control boards run normally, the failure possibility at the same time is very low.

The reset of the Agent will result in the heartbeat signal loss of the Agent, which is the main/standby switching condition with the highest priority, as shown in the following Table 4.

TABLE 4

Fault state C of master control board

|  | Main | Standby |
|---|---|---|
| ASON | OK | Absence |
| Agent | OK | OK |

In the fault state C of the master control board in Table 4:

The reset of the Agent in main state will cause a switching and will cause another switching after the success of the initial switching so as to return to the initial state. The reset of the ASON in main state or the s Agent in standby state will not cause a switching.

If the absence/heartbeat signal loss of ASON occurs in both the main board and the standby board, it is necessary to continue to compare the fault grades of the Agents to ensure that the Agent can be correctly switched when both the ASON in main state and the ASON in standby state are invalid.

It can be seen from the above that, although there is a communication channel between the ASON main module and standby module, as a control programmer for main/standby switching, the Agent is only in charge of collecting the fault states of the ASON in the same board, and does not collect the fault states of the ASON in the opposite board.

Figure 5:
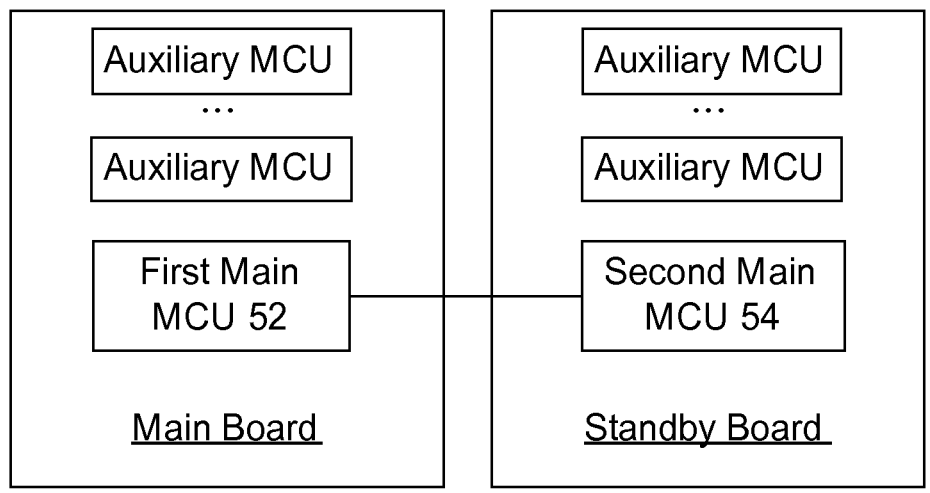
FIG. 5 shows a structure diagram of the system for switching the main board and a standby board according to one embodiment of the invention.

According to the embodiment, the master control board has both the Agent and ASON programs, but only the Agent operates the main/standby switching control module to ensure the consistent main/standby states of the Agent and ASON; the fault states of the Agent and ASON are finally unified and combined into the fault grade of the single board, and the Agent program as an only output notifies the opposite board of the fault grade; the consistence of the main/standby switching logics of the original single Agent master control board is kept and the fault grades are only further divided. According to the embodiment of the invention, a system for switching a main board and a standby board is provided, including a main board and a standby board that respectively include a plurality of MCUs. FIG. 5 shows a structure diagram of the system for switching the main board and the standby board according to one embodiment of the invention.

As shown in FIG. 5, the standby board comprises a second main MCU 54 configured to detect and report the faults in the auxiliary MCUs of the standby board and the faults in the second main MCU 54, wherein all MCUs except for the second main MCU in the standby board are auxiliary MCUs in the standby board. The main board comprises a first main MCU 52 coupled to the second main MCU 54 and configured to determine the fault grade of the main board according to the reported faults in all the auxiliary MCUs of the main board and the faults in the first main MCU 52, wherein all MCUs except for the first main MCU in the main board are the auxiliary MCUs in the main board; the first main MCU 52 is further configured to determine the fault grade of the standby board according to the faults in all auxiliary MCUs of the standby board and the faults in the second main MCU 54 reported by the second main MCU 54, and switch the main board and the standby board according to the fault grade of the main board and the fault grade of the standby board.

Preferably, the first main MCU 52 is further configured to compare the fault grade of the main board with that of the standby board, and switch the main board and the standby board if the fault grade of the standby board is higher than that of the main board. Preferably, the first main MCU 52 is further configured to switch the main board and the standby board when a fatal fault occurs in the first main MCU 52.

Figure 6:
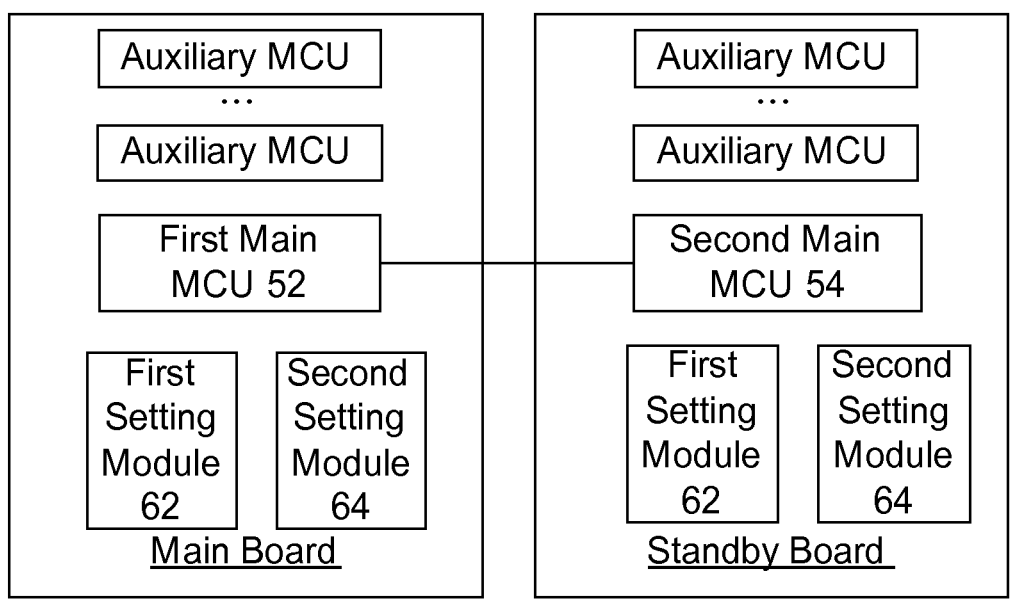
FIG. 6 shows a structure diagram of the system for switching the main board and the standby board according to one preferred embodiment of the invention.

FIG. 6 shows a structure diagram of the system for switching the main board and the standby board according to one preferred embodiment of the invention. As shown in FIG. 6, the system further comprises a first setting module 62 configured to set a priority for each fault, wherein a fault priority of the main MCU is higher than that of the auxiliary MCUs. Specifically, the first MCU 52 is further configured to determine the fault grades of the main board and the standby board according to the fault priorities of the main board and the standby board.

As shown in FIG. 6, the system further comprises a second setting module 64.

The second setting module 64 is configured to set MCUs belonging to one board to be all in main states or all in standby states. It should be understood that, the first setting module 62 and the second setting module 64 can be positioned either inside or outside the main MCU in the main board, and can be also positioned inside the standby board.

To sum up, according to the above embodiments, firstly, logic executor for the main/standby switching of the single board with a plurality of MCUs is simplified, which is determined as the main MCU, and the granularity for switching the whole single board is determined; then the composition of the nonfatal faults and the fatal faults in the single board with a plurality of MCUs are defined, and the faults in the plurality of MCUs are unified to the main MCU for processing. According to the above embodiments of the invention, the main/standby switching of the single boards with a plurality of MCUs is finally simplified to be the main/standby switching of the main MCUs, so as to maximally restrain the complexity of controlling the main/standby switching and keep the logic for the main/standby switching of the single board with a plurality of MCUs clear.

Obviously, those skilled in the art shall understand that the modules or steps of the present invention may be implemented by general computing devices and centralized in a single computing device or distributed in a network consisting of a plurality of computing devices. Optionally, the modules or steps may be implemented by program codes executable by the computing devices, so that they may be stored in a storage device to be executed by the computing device, or they can be respectively made into a plurality of integrated circuit modules, or the plurality of modules or steps thereof can be made into a single integrated circuit module. By doing so, the present invention is not limited to any specific combination of hardware and software.

The above are only preferred embodiments of the present invention and not used for limiting the present invention. For those skilled in the art, the present invention may have various modifications and variations. Any modifications, equivalent replacements, improvements and the like within the spirit and principle of the invention shall fall within the scope of the invention.

The invention claimed is:

1. A method for switching a main board and a standby board that respectively comprise a plurality of Micro Controller Units (MCUs), comprising:
   determining one MCU of the plurality of MCUs in the main board as a first main MCU and remaining MCUs as auxiliary MCUs; and determining one MCU of the plurality of MCUs in the standby board as a second main MCU and remaining MCUs as auxiliary MCUs;
   determining, by the first main MCU, a fault grade of the main board according to faults in the auxiliary MCUs of the main board and faults in the first main MCU;
   determining, by the first main MCU, a fault grade of the standby board according to faults in the auxiliary MCUs of the standby board and faults in the second main MCU reported by the second main MCU; and
   switching the main board and the standby board according to the fault grade of the standby board and the fault grade of the main board;
   wherein MCUs belonging to one board are all in main states or all in standby states.

2. The method according to claim 1, wherein the step of switching the main board and the standby board according to the fault grade of the standby board and the fault grade of the main board comprises:
   comparing, by the first main MCU, the fault grade of the main board with that of the standby board; and
   switching the main board and the standby board if the fault grade of the standby board is higher than that of the main board.

3. The method according to claim 1, wherein the step of switching the main board and the standby board according to the fault grade of the standby board and the fault grade of the main board comprises:
   switching the main board and the standby board when a fatal fault occurs in the first main MCU.

4. The method according to claim 1, wherein the step of determining, by the first main MCU, the fault grades of the main board and the standby board according to the faults comprises:
   setting a priority for each fault, wherein a fault priority of the main MCU is higher than that of the auxiliary MCUs; and
   determining, by the first main MCU, the fault grades of the main board and standby board according to the fault priorities of the main board and the standby board.

5. A system for switching a main board and a standby board, comprising a main board and a standby board that respectively comprise a plurality of MCUs; wherein,
   the standby board comprises a second main MCU configured to:
   detect and report faults in the auxiliary MCUs of the standby board and faults in the second main MCU, wherein all MCUs except for the second main MCU in the standby board are auxiliary MCUs of the standby board;
   the main board comprises a first main MCU configured to:
   determine a fault grade of the main board according to faults in the auxiliary MCUs of the main board and faults in the first main MCU, wherein all MCUs except for the first main MCU in the main board are auxiliary MCUS of the main board;
   determine a fault grade of the standby board according to faults in the auxiliary MCUs of the standby board and faults in the second main MCU reported by the second main MCU; and
   switch the main board and the standby board according to the fault grade of the main board and the fault grade of the standby board;
   the system further comprising: a second setting module configured to set MCUs belonging to one board to be all in main states or all in standby states.

6. The system according to claim 5, wherein the first main MCU is further configured to compare the fault grade of the main board with that of the standby board, and switch the main board and the standby board if the fault grade of the standby board is higher than that of the main board.

7. The system according to claim 5, wherein the first main MCU is further configured to switch the main board and the standby board when a fatal fault occurs in the first main MCU.

8. The system according to claim 5, further comprising a first setting module configured to set a priority for each fault;
   wherein, a fault priority of the main MCU is higher than that of the auxiliary MCUs; and
   the first main MCU is further configured to determine the fault grades of the main board and the standby board according to the fault priorities of the main board and the standby board.

9. The method according to claim 2, wherein the step of determining, by the first main MCU, the fault grades of the main board and the standby board according to the faults comprises:
   setting a priority for each fault, wherein a fault priority of the main MCU is higher than that of the auxiliary MCUs; and
   determining, by the first main MCU, the fault grades of the main board and standby board according to the fault priorities of the main board and the standby board.

10. The method according to claim 3, wherein the step of determining, by the first main MCU, the fault grades of the main board and the standby board according to the faults comprises:
    setting a priority for each fault, wherein a fault priority of the main MCU is higher than that of the auxiliary MCUs; and
    determining, by the first main MCU, the fault grades of the main board and standby board according to the fault priorities of the main board and the standby board.

11. The system according to claim 6, further comprising a first setting module configured to set a priority for each fault;
   wherein, a fault priority of the main MCU is higher than that of the auxiliary MCUs; and
   the first main MCU is further configured to determine the fault grades of the main board and the standby board according to the fault priorities of the main board and the standby board.

12. The system according to claim 7, further comprising a first setting module configured to set a priority for each fault;
   wherein, a fault priority of the main MCU is higher than that of the auxiliary MCUs; and
   the first main MCU is further configured to determine the fault grades of the main board and the standby board according to the fault priorities of the main board and the standby board.

* * * * *